United States Patent
Murakami et al.

(10) Patent No.: US 10,067,665 B2
(45) Date of Patent: Sep. 4, 2018

(54) OPTICAL TIME DOMAIN REFLECTOMETER AND DISPLAY METHOD OF OPTICAL TIME DOMAIN REFLECTOMETER

(71) Applicant: ANRITSU CORPORATION, Kanagawa (JP)

(72) Inventors: Taichi Murakami, Kanagawa (JP); Yasuhiro Miyake, Kangawa (JP)

(73) Assignee: ANRITSU CORPORATION, Kanagawa (JP)

( * ) Notice: Subject to any disclaimer, the term of this patent is extended or adjusted under 35 U.S.C. 154(b) by 171 days.

(21) Appl. No.: 15/363,264

(22) Filed: Nov. 29, 2016

(65) Prior Publication Data
US 2017/0160894 A1    Jun. 8, 2017

(30) Foreign Application Priority Data
Dec. 8, 2015  (JP) ................. 2015-239753

(51) Int. Cl.
*G06F 3/0485* (2013.01)
*G01M 11/00* (2006.01)
(Continued)

(52) U.S. Cl.
CPC ....... *G06F 3/0485* (2013.01); *G01M 11/3109* (2013.01); *G06F 3/04817* (2013.01); *G06F 3/04883* (2013.01)

(58) Field of Classification Search
CPC .............. G06F 3/0485; G06F 3/04817; G06F 3/04883; G01M 11/3109
See application file for complete search history.

(56) References Cited

U.S. PATENT DOCUMENTS

| | | | | |
|---|---|---|---|---|
| 7,206,703 | B1 * | 4/2007 | Papageorgiou | G01R 31/11 702/58 |
| 2005/0212526 | A1 * | 9/2005 | Blades | G01R 31/02 324/543 |

(Continued)

OTHER PUBLICATIONS

Murakami, Taichi et al. "Development of MT9083 Access Master Fiber Visualizer and Connector Inspection Functions" IN: Anritsu Technical Review, Sep. 2014, No. 22, pp. 1-8.

*Primary Examiner* — Tadesse Hailu
(74) *Attorney, Agent, or Firm* — Pearne & Gordon LLP (57) ABSTRACT

An optical time domain reflectometer includes: an OTDR measurement unit; an event detection unit that detects an event using the measurement result of the OTDR measurement unit; a display unit that displays a plurality of icons indicating events in an event display region $A_{IV}$ and displays information of an event, which is located in a specific region $A_{ATT}$ of the event display region $A_{IV}$, in an information display region $A_{INF}$; an operation detection unit that detects a swipe operation in the event display region $A_{IV}$; and an event-of-interest changing unit that scrolls the events displayed in the event display region $A_{IV}$ according to the swipe operation to change the display of the information display region $A_{INF}$ to information corresponding to the event indicated by the icon located in the specific region $A_{ATT}$.

19 Claims, 7 Drawing Sheets

(51) Int. Cl.
    *G06F 3/0481*     (2013.01)
    *G06F 3/0488*     (2013.01)

(56) References Cited

U.S. PATENT DOCUMENTS

| | | | | |
|---|---|---|---|---|
| 2005/0259242 | A1* | 11/2005 | Bridge | G01M 11/3109 356/73.1 |
| 2011/0128257 | A1* | 6/2011 | Kim | G06F 3/041 345/175 |
| 2012/0200846 | A1* | 8/2012 | Levin | H04B 10/071 356/73.1 |
| 2014/0198311 | A1* | 7/2014 | L'Heureux | G01M 11/3118 356/73.1 |
| 2014/0233019 | A1* | 8/2014 | Chen | G01M 11/088 356/73.1 |
| 2016/0097833 | A1* | 4/2016 | Han | G01R 29/0878 343/702 |
| 2016/0356670 | A1* | 12/2016 | Brillhart | G01M 11/3136 |
| 2016/0381123 | A1* | 12/2016 | Kanne | H04Q 9/00 709/224 |

* cited by examiner

OPTICAL TIME DOMAIN REFLECTOMETER AND DISPLAY METHOD OF OPTICAL TIME DOMAIN REFLECTOMETER

TECHNICAL FIELD

The present invention relates to an optical time domain reflectometer and a display method of an optical time domain reflectometer.

BACKGROUND ART

An optical time domain reflectometer (OTDR) has been used for detecting fault such as break, bend in an optical fiber. The amount of optical fibers being laid has rapidly increased with an increase in the capacity of mobile traffic. However, there are an increasing number of cases where operators inexperienced in handling of optical fiber cables are using an OTDR. Therefore, for OTDR, analysis results being easily understandable and an intuitive operation are required (for example, refer to Non-patent Document 1).

Figure 11:
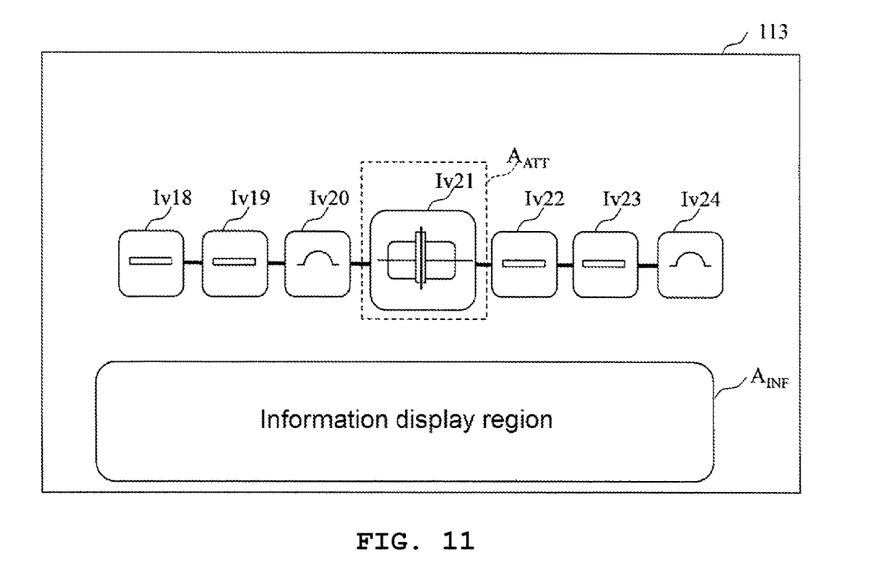
FIG. 11 shows an example of the screen configuration in Non-patent Document 1.

FIG. 11 shows an example of the screen configuration disclosed in Non-patent Document 1. The screen is configured to include icons indicating events Iv18 to Iv24 that are failure points of the optical fiber detected by the analysis, details of an event Iv21 that is an event of interest (location where the operator wants to check the line), and a hard key (not shown) for changing an event of interest provided outside a display unit 113. In addition, the classification of failures is shown by the symbol in each icon, an event of interest is displayed in an enlarged manner or displayed so as to be surrounded by a frame, and failure point information (distance, loss, and failure classification) or the like is displayed in an information display region $A_{INF}$. In a case where there is a failure, the operator changes the event of interest by operating the hard key in order to identify the loss and the distance of the failure point.

RELATED ART DOCUMENT

Non-Patent Document

[Non-patent Document 1] Taichi Murakami, Tatsuyuki Maki, Taiki Fukushima, Tomohide Yamazaki, "Development of MT9083 Access Master Fiber Visualizer and Optical Connector End Surface Inspection Function", ANRITSU Technical, No. 89, March 2014

DISCLOSURE OF THE INVENTION

Problem that the Invention is to Solve

In the configuration described above, however, in a case where the number of events is high, it is necessary to press the hard key by the number of events when changing the event of interest. For this reason, in a case where the number of events is high, the number of operations when operating the optical time domain reflectometer disclosed in Non-patent Document 1 is increased. As a result, it is not possible to check for failures efficiently.

Therefore, it is an object of the present invention to provide an optical time domain reflectometer in which an event of interest can be changed through an intuitive operation and failure points can be checked efficiently even in a case where the number of events increases.

Means for Solving the Problem

An optical time domain reflectometer according to a first aspect of the present invention includes: a measurement unit that makes a light pulse be incident on an optical fiber under test and receives return light that returns due to reflection or scattering of the light pulse in the optical fiber under test; an event detection unit that detects events where an intensity of the return light changes; a display unit that displays a plurality of icons corresponding to the events in an event display region and that displays information of an event, which is indicated by an icon located in a specific region of the event display region, in an information display region; an operation detection unit that detects an amount of swipe operation in the event display region; and an event-of-interest changing unit that scrolls icons displayed in the event display region according to the amount of swipe operation, which has been detected by the operation detection unit, to change the display of the information display region to information corresponding to the event indicated by the icon located in the specific region.

According to a second aspect of the present invention, in the optical time domain reflectometer according to the first aspect of the present invention, the operation detection unit may detect a tap operation on the icon, and the event-of-interest changing unit may scroll icons displayed in the event display region to move the icon, at which the tap operation has been detected, to the specific region.

According to a third aspect of the present invention, in the optical time domain reflectometer according to the first aspect of the present invention, the display unit may display an occurrence point of each event in the entire optical fiber under test in an occurrence point display region, the operation detection unit may detect a tap operation on an occurrence point in the occurrence point display region, and the event-of-interest changing unit may scroll icons displayed in the event display region to move the icon of the event of the occurrence point, at which the tap operation has been detected, to the specific region.

According to a fourth aspect of the present invention, in the optical time domain reflectometer according to the second aspect of the present invention, the display unit may display an occurrence point of each event in the entire optical fiber under test in an occurrence point display region, the operation detection unit may detect a tap operation on the occurrence point in the occurrence point display region, and the event-of-interest changing unit may scroll icons displayed in the event display region to move the icon of the event of the occurrence point, at which the tap operation has been detected, to the specific region.

According to a fifth aspect of the present invention, in the optical time domain reflectometer according to the first aspect of the present invention, the operation detection unit may detect a tap operation on two icons indicating two different events, a calculation unit that calculates a loss and a distance between the two events where the tap operation has been detected may be further provided, and the display unit may highlight the icon where the tap operation has been detected and display the distance and the loss calculated by the calculation unit in the information display region.

According to a sixth aspect of the present invention, in the optical time domain reflectometer according to the first aspect of the present invention, the display unit may display an occurrence point of each event in the entire optical fiber under test in an occurrence point display region, the operation detection unit may detect a tap operation on two different occurrence points in the occurrence point display region, a calculation unit that calculates a loss and a distance between the two occurrence points where the tap operation has been detected may be further provided, and the display unit may highlight the occurrence points where the tap operation has been detected and display the distance and the loss calculated by the calculation unit in the information display region.

According to a seventh aspect of the present invention, in the optical time domain reflectometer according to the first aspect of the present invention, the display unit may display a plurality of icons corresponding to the events in order of the events in the optical fiber under test.

According to an eighth aspect of the present invention, in the optical time domain reflectometer according to the second aspect of the present invention, the display unit may display a plurality of icons corresponding to the events in order of the events in the optical fiber under test.

According to a ninth aspect of the present invention, in the optical time domain reflectometer according to the fifth aspect of the present invention, the display unit may display a plurality of icons corresponding to the events in order of the events in the optical fiber under test.

According to a tenth aspect of the present invention, in the optical time domain reflectometer according to the first aspect of the present invention, the display unit may display the icon of the event located in the specific region as an icon larger than icons of events located outside the specific region.

According to an eleventh aspect of the present invention, in the optical time domain reflectometer according to the second aspect of the present invention, the display unit may display the icon of the event located in the specific region as an icon larger than icons of events located outside the specific region.

A display method of an optical time domain reflectometer according to a twelfth aspect of the present invention includes: a measurement step of making a light pulse be incident on an optical fiber under test and receiving return light that returns due to reflection or scattering of the light pulse in the optical fiber under test; an event detection step of detecting events where an intensity of the return light changes using a measurement result in the measurement step; a display step of displaying a plurality of icons corresponding to the events in an event display region of a display unit and displaying information of an event, which is indicated by an icon located in a specific region of the event display region, in an information display region of the display unit; and an event-of-interest changing step of, when a swipe operation in the event display region is detected, scrolling icons displayed in the event display region according to the swipe operation to change the display of the information display region to information corresponding to the event indicated by the icon located in the specific region.

According to a thirteenth aspect of the present invention, in the display method of an optical time domain reflectometer according to the twelfth aspect of the present invention, in the display step, a plurality of icons corresponding to the events may be displayed in order of the events in the optical fiber under test.

According to a fourteenth aspect of the present invention, in the display method of an optical time domain reflectometer according to the twelfth aspect of the present invention, in the display step, the icon of the event located in the specific region may be displayed as an icon larger than icons of events located outside the specific region.

According to a fifteenth aspect of the present invention, in the display method of an optical time domain reflectometer according to the thirteenth aspect of the present invention, in the display step, the icon of the event located in the specific region may be displayed as an icon larger than icons of events located outside the specific region.

A display method of an optical time domain reflectometer according to a sixteenth aspect of the present invention includes: a measurement step of making a light pulse be incident on an optical fiber under test and receiving return light that returns due to reflection or scattering of the light pulse in the optical fiber under test; an event detection step of detecting events where an intensity of the return light changes using a measurement result in the measurement step; a display step of displaying a plurality of icons corresponding to the events in an event display region of a display unit and displaying information of an event, which is indicated by an icon located in a specific region of the event display region, in an information display region of the display unit; and an event-of-interest changing step of, when a tap operation on the icon in the event display region is detected, scrolling icons displayed in the event display region to move the icon, at which the tap operation has been detected, to the specific region so that the display of the information display region is changed to information corresponding to the event indicated by the icon located in the specific region.

According to a seventeenth aspect of the present invention, in the display method of an optical time domain reflectometer according to the sixteenth aspect of the present invention, in the display step, a plurality of icons corresponding to the events may be displayed in order of the events in the optical fiber under test.

According to an eighteenth aspect of the present invention, in the display method of an optical time domain reflectometer according to the sixteenth aspect of the present invention, in the display step, the icon of the event located in the specific region may be displayed as an icon larger than icons of events located outside the specific region.

According to a nineteenth aspect of the present invention, in the display method of an optical time domain reflectometer according to the seventeenth aspect of the present invention, in the display step, the icon of the event located in the specific region may be displayed as an icon larger than icons of events located outside the specific region.

In addition, the inventions described above can be combined in any way possible.

Advantage of the Invention

According to the present invention, it is possible to provide an optical time domain reflectometer in which an event of interest can be changed through an intuitive operation and failure points can be checked efficiently even in a case where the number of events increases.

BEST MODE FOR CARRYING OUT THE INVENTION

Hereinafter, embodiments of the present invention will be described in detail with reference to the accompanying diagrams. In addition, the present invention is not limited to the embodiments shown below. These embodiments are only illustrative, and the present invention can be implemented in forms having been subjected to various modifications and improvements based on the knowledge of those skilled in the art. In addition, it is assumed that components denoted by the same reference numerals in this specification and diagrams are the same.

First Embodiment

Figure 1:
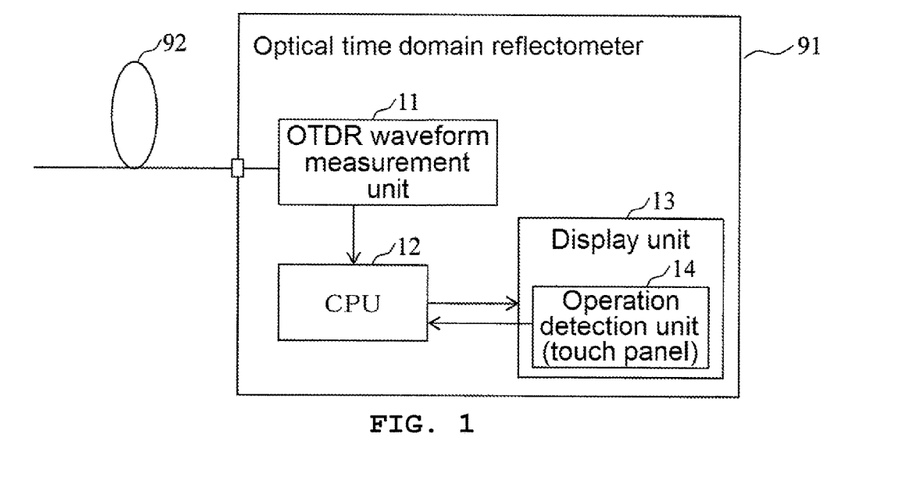
FIG. 1 shows an example of the configuration of an optical time domain reflectometer according to an embodiment.

FIG. 1 shows an example of the configuration of an optical time domain reflectometer according to the present embodiment. An optical time domain reflectometer 91 according to the present embodiment includes an OTDR waveform measurement unit 11, a central processing unit (CPU) 12, a display unit 13, and an operation detection unit 14. The operation detection unit 14 detects the operation of the operator. The display unit 13 according to the present embodiment has the operation detection unit 14 using a touch panel.

The OTDR waveform measurement unit 11 functions as a measurement unit, and measures the OTDR waveform of an optical fiber under test 92 by making a light pulse be incident on the optical fiber under test 92 and receiving return light that returns due to reflection or scattering of the light pulse in the optical fiber under test 92. The CPU 12 functions as an event detection unit, and detects an event by analyzing the OTDR waveform. Here, the event is any failure point where the intensity of return light changes. Any failure is, for example, connection, branching, bending, and fusion. The CPU 12 outputs the display data of the OTDR waveform analysis result to the display unit 13. Then, the display unit 13 displays various kinds of information including the icon of the event of the optical fiber under test 92.

Figure 2:
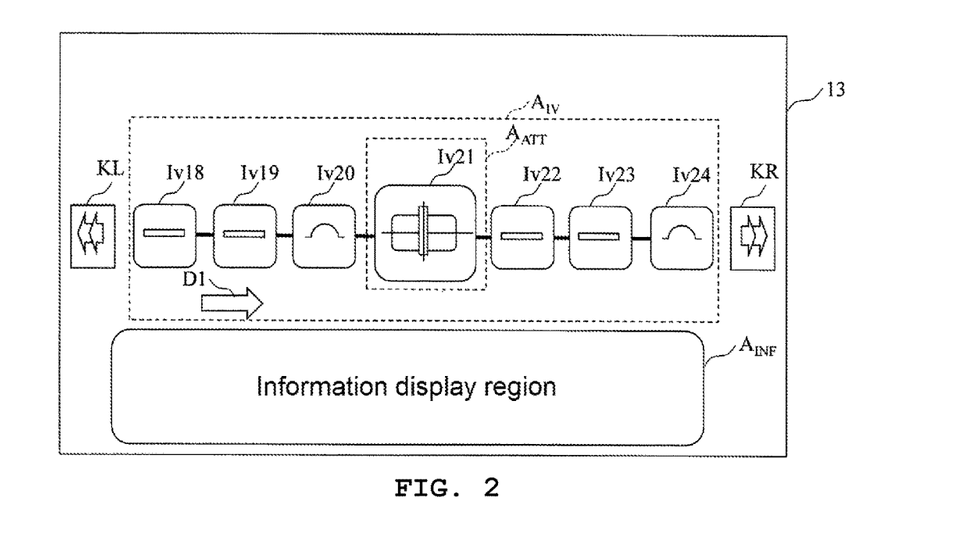
FIG. 2 shows an example of the screen configuration in a first embodiment.

FIG. 2 shows an example of the screen configuration according to the present embodiment. In an event display region $A_{IV}$, icons of three or more events Iv18 to Iv24 that are continuous on the optical fiber under test 92 are displayed. The respective icons are connected to each other by a straight line indicating the optical line. A symbol according to the type of failure is given to each icon. Accordingly, the classification of failure and the chronological order of events in the optical fiber under test 92 are displayed at the same time. The icon of the event Iv21 disposed in a specific region $A_{ATT}$ of the event display regions $A_{IV}$ is displayed in an enlarged manner as an event of interest.

A color or a pattern determined by the pass or fail of the characteristic of events may be given to each icon. For example, the background or the outer edge of an icon is displayed in blue or green when the event is a pass, and the background or the outer edge of an icon is displayed in red when the event is a fail. Thus, by determining the color of each icon according to the pass or fail of the event, it is possible to express that a failed event is present even in a case where icons to be displayed in the event display region $A_{IV}$ are made small.

The display unit 13 displays the information of the event of interest in the information display region $A_{INF}$. For example, in a case where the event of interest is the event Iv21, the CPU 12 displays at least one of a distance from the incidence end or the far end of the optical fiber under test 92 to the event Iv21, a return loss in the event Iv21, a loss value in the event Iv21, a magnified waveform in the event Iv21 in the OTDR waveform, and pass or fail of the event Iv21 in the information display region $A_{INF}$.

It is preferable that the display unit 13 displays the pass or fail in the entire optical fiber under test 92 in the information display region $A_{INF}$. In addition, it is preferable that the display unit 13 displays a loss value in the entire optical fiber under test 92 in the information display region $A_{INF}$. By displaying both the loss value in the entire optical fiber under test 92 and the loss value in the event Iv21, it is possible to grasp the degree of contribution of the loss value in the event Iv21.

Figure 3:
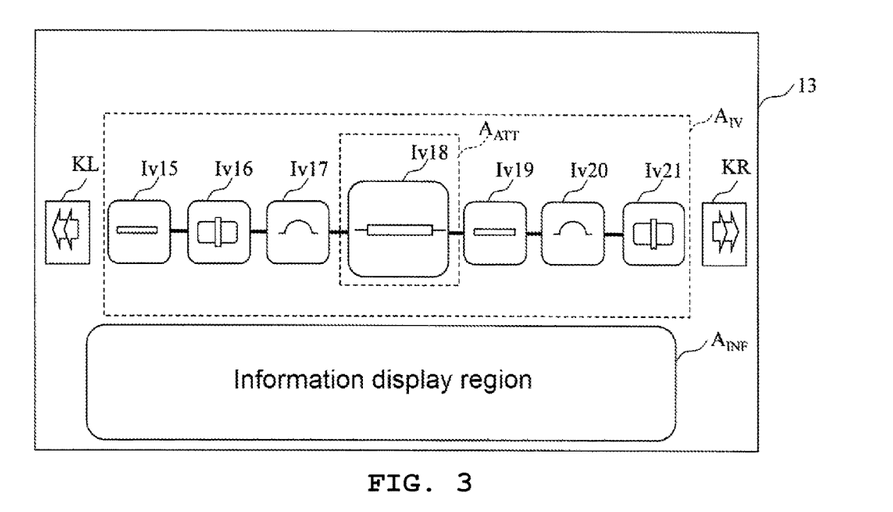
FIG. 3 shows an example of the screen configuration after changing an event of interest in the first embodiment.

The operation detection unit 14 detects the amount of swipe operation D1 in the event display region $A_{IV}$. Then, the CPU 12 functions as an event-of-interest changing unit, and scrolls the icons of events to be displayed in the event display region $A_{IV}$ according to the amount of swipe operation D1. Accordingly, when the swipe operation D1 is performed from left to right, the events Iv18 to Iv24 move horizontally to the right. At this time, the event of an icon closest to the specific region $A_{ATT}$ during the movement always becomes an event of interest. Therefore, as shown in FIG. 3, icons of the events Iv15 to Iv21 after the movement are displayed in the event display region $A_{IV}$. It is also possible to give inertia to movement by sensing the acceleration of the swipe.

Here, icons of the events Iv20 and Iv19 pass through the specific region $A_{ATT}$ in order until the icon of the event Iv18 moves to the specific region $A_{ATT}$. At this time, the icons of the events Iv20 and Iv19 are also displayed in an enlarged manner when passing through the specific region $A_{ATT}$. Thus, when the events pass through the specific region $A_{ATT}$ by the swipe operation D1, it is preferable to display the icon of an event, which is displayed in the specific region $A_{ATT}$, in an enlarged manner.

In addition, when the icons of the events Iv20 and Iv19 pass through the specific region $A_{ATT}$ in order, the CPU 12 functions as an event-of-interest changing unit, and changes information displayed in the information display region $A_{INF}$ for each of the events Iv20 and Iv19 of the icons located in the specific region $A_{ATT}$. Thus, by swipe operation of tracing the screen left and right with a finger or the like, it is possible to scroll the icon column. As a result, the event of the specific region $A_{ATT}$ always becomes an event of interest.

Figure 4:
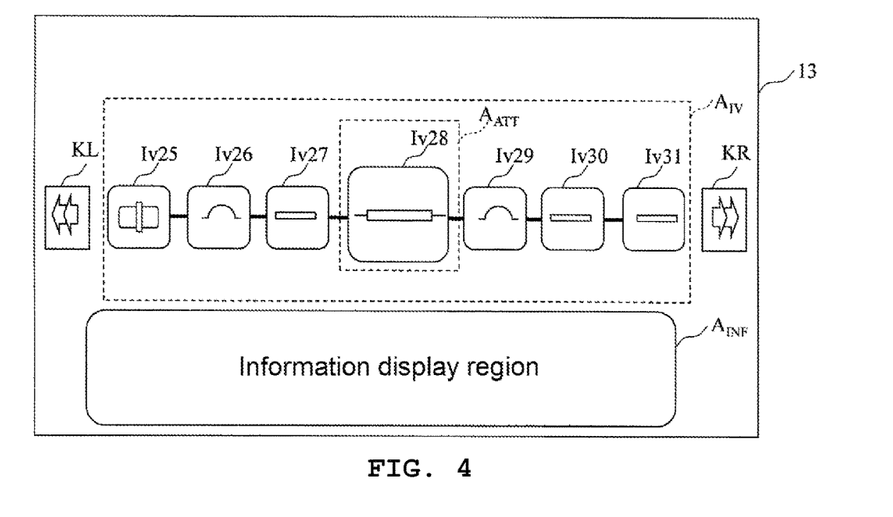
FIG. 4 shows an example of the screen configuration after tapping a touch key KR in the first embodiment.
Figure 5:
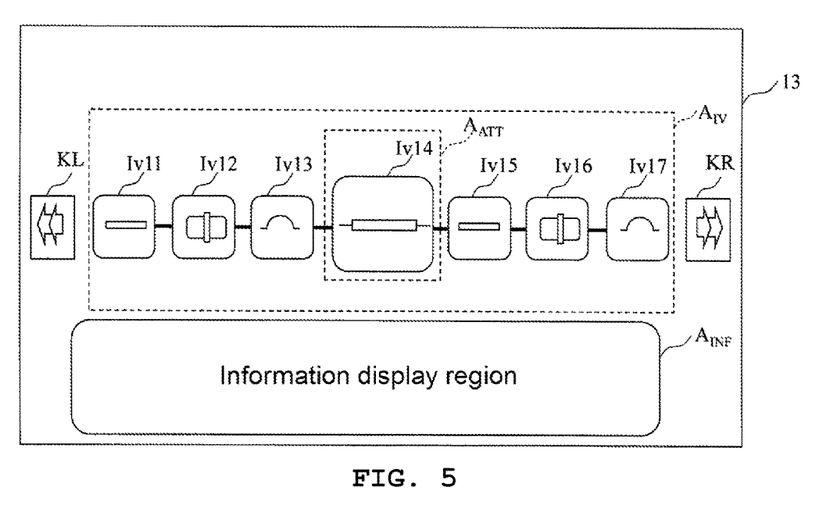
FIG. 5 shows an example of the screen configuration after tapping a touch key KL in the first embodiment.

It is preferable that the operation detection unit detects a tap operation on touch keys KR and KL displayed on the display unit 13. When the touch key KR is tapped once, the CPU 12 moves the icon of the event displayed in the event display region $A_{IV}$ to the left. When the touch key KR is tapped once in a display state shown in FIG. 2, icons of events Iv25 to Iv31 are displayed in the event display region $A_{IV}$ and the icon of the event Iv28 is disposed in the specific region $A_{ATT}$, as shown in FIG. 4. When the touch key KL is tapped once, the CPU 12 moves the icon of the event displayed in the event display region $A_{IV}$ to the right. When the touch key KL is tapped once in the display state shown in FIG. 2, icons of events Iv11 to Iv17 are displayed in the event display region $A_{IV}$ and the icon of the event Iv14 is disposed in the specific region $A_{ATT}$, as shown in FIG. 5. In addition, it is needless to say that the touch keys KR and KL may be set to perform movement of one icon by one tap operation.

It is preferable that the operation detection unit 14 detects a pinch operation and a stretch operation in the event display region $A_{IV}$. In this case, the icon of a non-interest event is reduced according to the pinch operation, and the icon of a non-interest event is enlarged according to the stretch operation.

As described above, in the present embodiment, since it is possible to change the event of interest by the swipe operation or the operation of tapping the touch keys KR and KL, the change of the event of interest that requires multiple operations can be realized by one operation. Therefore, in the present embodiment, it is possible to provide the optical time domain reflectometer 91 in which an event of interest can be changed through an intuitive operation and failure points can be checked efficiently even in a case where the number of events increases.

The specific region $A_{ATT}$ can be any region of the event display region $A_{IV}$. For example, the specific region $A_{ATT}$ may be the center of the event display region $A_{IV}$ shown in FIGS. 2 and 3, or may be the end of the event display region $A_{IV}$.

The number of icons of events displayed in the event display region $A_{IV}$ can be any number of 3 or more. For example, the number of icons of events displayed in the event display region $A_{IV}$ may be 8 or more without being limited to 7 shown in FIGS. 2 and 3.

In the swipe operation example shown in FIGS. 2 and 3, a swipe operation to the right is shown. However, also in the case of a swipe operation to the left, the events Iv18 to Iv24 move horizontally to the left and the event of an icon closest to the specific region $A_{ATT}$ during the movement always becomes an event of interest, similar to the case of the swipe operation to the right.

Figure 6:
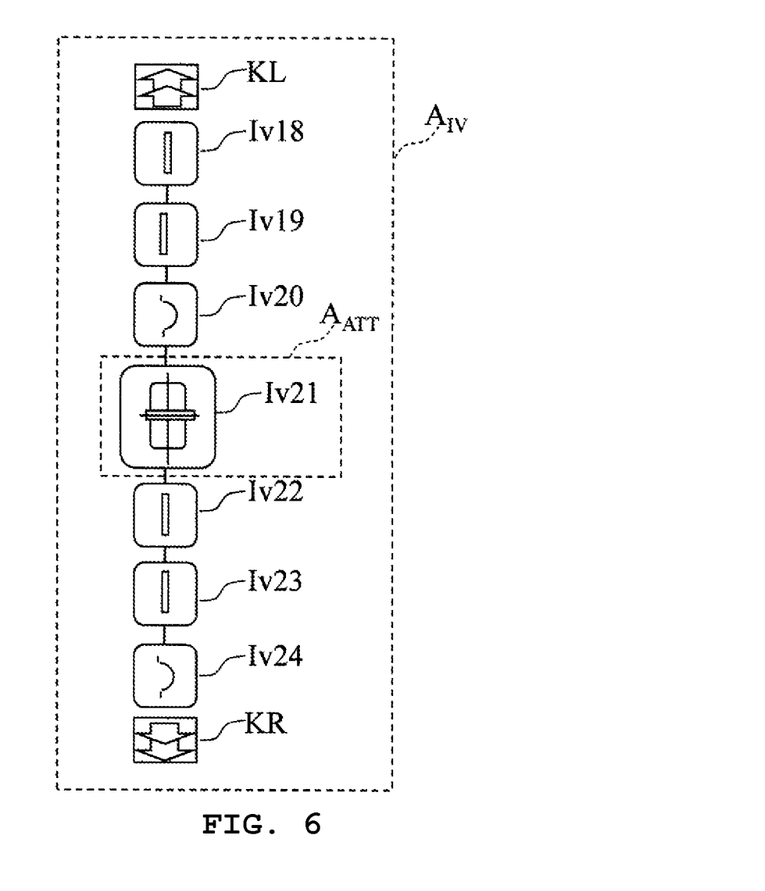
FIG. 6 shows a second display example of the event display region.

In FIGS. 2 to 5, an example is shown in which the icons displayed in the event display region $A_{IV}$ are disposed in the horizontal direction of the screen. However, the present invention is not limited thereto. For example, as shown in FIG. 6, icons may also be disposed in the vertical direction of the screen. In this case, since the optical lines are connected vertically, it is preferable to rotate the symbol of each icon in a direction according to the straight line indicating the optical line.

Figure 7:
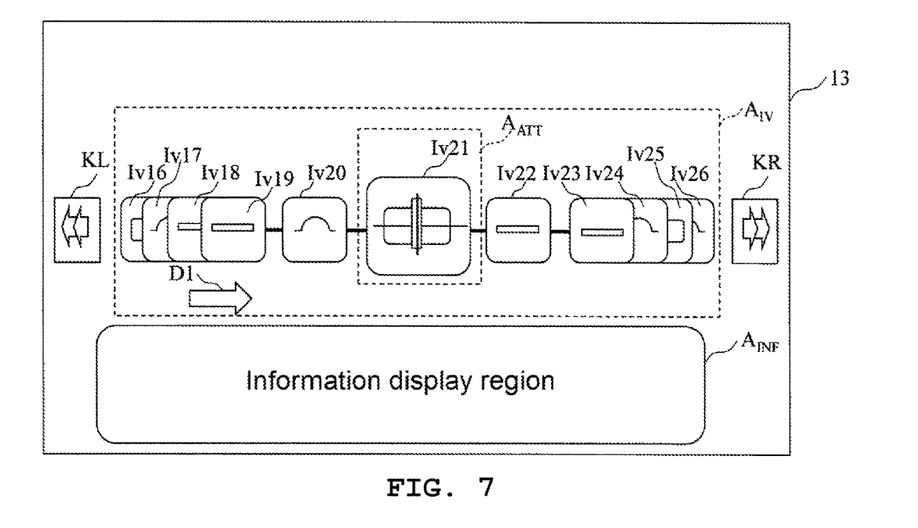
FIG. 7 shows a third display example of the event display region.

In addition, in FIGS. 2 to 5, an example is shown in which the icons displayed in the event display region $A_{IV}$ are disposed at predetermined intervals. However, the present invention is not limited thereto. For example, as shown in FIG. 7, non-interest events may be displayed so as to overlap each other outside the specific region $A_{ATT}$.

In this case, regions where icons overlap each other may be uniform, but it is preferable that the regions are not uniform. For example, in the overlapping between icons, it is preferable that the icon of an event far from the event of interest is larger than the icon of an event close to the event of interest. Therefore, since it is possible to display a larger number of icons of events in the event display region $A_{IV}$, it is possible to grasp how many events of the optical fiber under test 92 are present at a glance.

Figure 8:
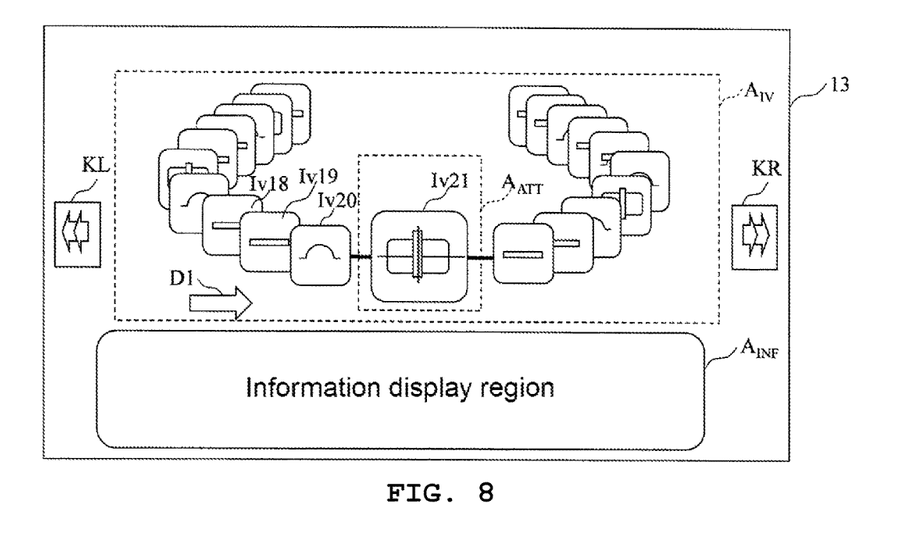
FIG. 8 shows a fourth display example of the event display region.

In addition, in FIGS. 2 to 5, an example is shown in which the icons displayed in the event display region $A_{IV}$ are linearly disposed. However, the present invention is not limited thereto. Non-interest events may be disposed in a curved manner outside the specific region $A_{ATT}$. Any curve can be applied. For example, as shown in FIG. 8, an arc shape can be applied. Therefore, it is possible to display a larger number of icons of events in the event display region $A_{IV}$.

In this case, as shown in FIG. 8, it is preferable to display non-interest events so as to overlap each other outside the specific region $A_{ATT}$. In this case, regions where icons overlap each other may be uniform, but it is preferable that the regions are not uniform. For example, in the overlapping between icons, it is preferable that the icon of an event far from the event of interest is larger than the icon of an event close to the event of interest.

In the screen configuration shown in FIG. 8, it is possible to display a large number of events in the event display region $A_{IV}$. Accordingly, icons of all events of the optical fiber under test 92 may be displayed in the event display region $A_{IV}$. In this case, when the CPU 12 functions as an event-of-interest changing unit, the CPU rotates icons, which are circularly arranged, while switching the event of interest according to the swipe operation D1.

Second Embodiment

Figure 9:
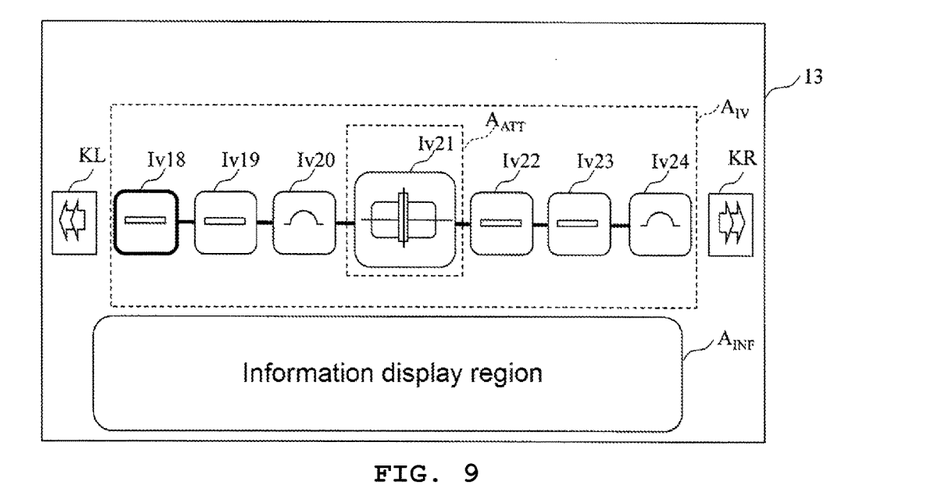
FIG. 9 shows an example of the screen configuration in a second embodiment.

FIG. 9 shows an example of the screen configuration according to the present embodiment. In the present embodiment, in addition to the function in the first embodiment, the operation detection unit 14 further detects a tap operation on the icon displayed in the event display region $A_{IV}$. Then, the CPU 12 functions as an event-of-interest changing unit, and moves the icon, at which a tap operation has been detected, to the specific region $A_{ATT}$.

For example, when the icon of the event Iv18 that is a non-interest event is pressed (tapped), the CPU 12 scrolls icons displayed in the event display region $A_{IV}$ to move the icon of the event Iv18 to the specific region $A_{ATT}$ so that the event Iv18 becomes an event of interest. Thus, by tapping an event that needs to be an event of interest, events in the event display region $A_{IV}$ move horizontally in a moment. As a result, the tapped event becomes an event of interest. Therefore, as shown in FIG. 3, the icons of the events Iv15 to Iv21 after the movement are displayed in the event display region $A_{IV}$.

At this time, similar to the case of the swipe operation D1, it is preferable to set the events Iv20 and Iv19 as events of interest when the icons of the events Iv20 and Iv19 pass through the specific region $A_{ATT}$.

Third Embodiment

Figure 10:
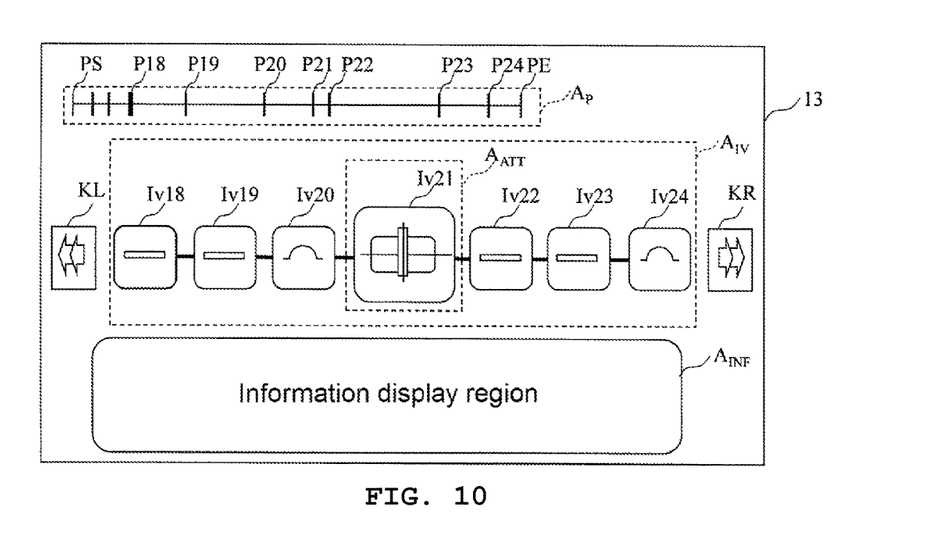
FIG. 10 shows an example of the screen configuration in a third embodiment.

The CPU 12 detects an event occurrence point when detecting an event using the OTDR waveform. The display unit 13 displays the occurrence point of each event in the entire optical fiber under test 92 in an occurrence point display region $A_P$.

FIG. 10 shows an example of the screen configuration according to the present embodiment. In the present embodiment, as an example, a case is shown in which occurrence points P18 to P24 of events Iv18 to Iv24 are displayed in the occurrence point display region $A_P$. For example, the occurrence point display region $A_P$ includes a straight line showing the entire optical fiber under test 92, and the occurrence points P18 to P24 of events for the entire optical fiber under test 92 on the straight line are displayed.

Here, it is preferable that a color or a pattern determined by the pass or fail of the characteristic of events may be given to each of the occurrence points P18 to P24. Therefore, it is possible to quickly identify the occurrence point of an event for which the characteristic of events is a fail.

In the present embodiment, in addition to the function in the first embodiment, the operation detection unit 14 further detects a tap operation on the occurrence points P18 to P24 displayed on the display unit 13. For example, it is assumed that the occurrence point P18 has been tapped. In this case, the CPU 12 functions as an event-of-interest changing unit, and scrolls the icons displayed in the event display region $A_{IV}$ to move the icon of the event Iv18 of the occurrence point P18, at which a tap operation has been detected, to the specific region $A_{ATT}$. Therefore, as shown in FIG. 3, the icons of the events Iv15 to Iv21 after the movement are displayed in the event display region $A_{IV}$.

Thus, in the present embodiment, by tapping an event occurrence point of interest, events in the event display region $A_{IV}$ move horizontally in a moment. As a result, the tapped event becomes an event of interest. At this time, similar to the case of the swipe operation D1, it is preferable to set the events Iv20 and Iv19 as events of interest when the icons of the events Iv20 and Iv19 pass through the specific region $A_{ATT}$.

Fourth Embodiment

Although the event of interest is only one point in the first to third embodiments, the event of interest is two points in the present embodiment. The optical time domain reflectometer 91 according to the present embodiment changes the display of the display unit 13 according to the tap operation in the event display region $A_{IV}$.

As the optical time domain reflectometer 91 according to the present embodiment, it is possible to use the configuration shown in FIG. 1. In the case of applying the present embodiment to the optical time domain reflectometer 91 according to the first and second embodiments, it is possible to use the screen configurations shown in FIGS. 2 to 9. In the case of applying the present embodiment to the optical time domain reflectometer 91 according to the third embodiment, it is possible to use the screen configuration shown in FIG. 10.

The operation detection unit 14 detects a tap operation on the icons of two different events. For example, a tap operation is performed on the icons of the events Iv18 and Iv20. Then, the display unit 13 highlights the icons of the events Iv18 and In20 where the tap operation has been detected. As examples of the highlighting, the icons may be enlarged, or may be made to have a different color from the other icons.

The CPU 12 functions as a calculation unit, and calculates the loss and the distance of the events Iv18 and In20 of the icons where the tap operation has been detected. The display unit 13 displays the loss and the distance calculated by the CPU 12 in the information display region $A_{INF}$.

As described above, in the present embodiment, it is possible to further perform display in a case where the event of interest is two points in addition to the first to third embodiments in which the event of interest is one point.

However, when applying the present embodiment to the second embodiment, the operation detection unit 14 is made to be able to identify whether the event of interest is one point or two points. For example, in a case where only one icon is tapped, the operation detection unit 14 determines that the event of interest is one point. In addition, in a case where two icons are tapped at the same time, the operation detection unit 14 determines that the event of interest is two points.

Fifth Embodiment

In the optical time domain reflectometer 91 according to the present embodiment, the event of interest is two points as in the fourth embodiment. The optical time domain reflectometer 91 according to the present embodiment changes the display of the display unit 13 according to the tap operation in the occurrence point display region $A_P$.

As the optical time domain reflectometer 91 according to the present embodiment, it is possible to use the configuration shown in FIG. 1. In the case of applying the present embodiment to the optical time domain reflectometer 91 according to the first to fourth embodiments, it is possible to use the screen configuration shown in FIG. 10.

In the present embodiment, the operation detection unit 14 detects a tap operation on two different occurrence points in the occurrence point display region $A_P$. For example, a tap operation is performed on the occurrence points P18 and P20. Then, the display unit 13 highlights the occurrence points P18 and P20 where the tap operation has been detected. As examples of the highlighting, a mark indicating an occurrence point, such as P18 shown in FIG. 10, may be enlarged, or the color of the mark indicating an occurrence point may be changed.

The CPU 12 functions as a calculation unit, and calculates the loss and the distance between the occurrence points P18 and P20 where a tap operation has been detected. The display unit 13 displays the distance and the loss calculated by the CPU 12 in the information display region $A_{INF}$.

As described above, in the present embodiment, it is possible to further perform display in a case where the event of interest is two points in addition to the first to third embodiments in which the event of interest is one point. However, when applying the present embodiment to the third embodiment, the operation detection unit 14 is made to be able to identify whether the event of interest is one point or two points.

For example, in a case where only one occurrence point is tapped, the operation detection unit 14 determines that the event of interest is one point. In addition, in a case where two occurrence points are tapped at the same time, the operation detection unit 14 determines that the event of interest is two points.

The present invention can be applied to the information and communication industry.

DESCRIPTION OF REFERENCE NUMERALS AND SIGNS

11: OTDR waveform measurement unit
12: CPU
13, 113: display unit
14: operation detection unit
91: optical time domain reflectometer
92: optical fiber under test

What is claimed is:
1. An optical time domain reflectometer, comprising:
a measurement unit that makes a light pulse be incident on an optical fiber under test and receives return light that returns due to reflection or scattering of the light pulse in the optical fiber under test;

an event detection unit that detects events where an intensity of the return light changes;

a display unit that displays a plurality of icons corresponding to the events in an event display region and that displays information of an event, which is indicated by an icon located in a specific region of the event display region, in an information display region;

an operation detection unit that detects an amount of swipe operation in the event display region; and an event-of-interest changing unit that scrolls icons displayed in the event display region according to the amount of swipe operation, which has been detected by the operation detection unit, and changes the display of the information display region to information corresponding to the event indicated by the icon located in the specific region.

2. The optical time domain reflectometer according to claim 1, wherein the operation detection unit detects a tap operation on the icon, and the event-of-interest changing unit scrolls icons displayed in the event display region to move the icon, at which the tap operation has been detected, to the specific region.

3. The optical time domain reflectometer according to claim 1, wherein the display unit displays an occurrence point of each event in the entire optical fiber under test in an occurrence point display region, the operation detection unit detects a tap operation on the occurrence point in the occurrence point display region, and the event-of-interest changing unit scrolls icons displayed in the event display region to move the icon of the event of the occurrence point, at which the tap operation has been detected, to the specific region.

4. The optical time domain reflectometer according to claim 2, wherein the display unit displays an occurrence point of each event in the entire optical fiber under test in an occurrence point display region, the operation detection unit detects a tap operation on the occurrence point in the occurrence point display region, and the event-of-interest changing unit scrolls icons displayed in the event display region to move the icon of the event of the occurrence point, at which the tap operation has been detected, to the specific region.

5. The optical time domain reflectometer according to claim 1, wherein the operation detection unit detects a tap operation on two icons indicating two different events, a calculation unit that calculates a loss and a distance between the two events where the tap operation has been detected is further provided, and the display unit highlights the icon where the tap operation has been detected and displays the distance and the loss calculated by the calculation unit in the information display region.

6. The optical time domain reflectometer according to claim 1, wherein the display unit displays an occurrence point of each event in the entire optical fiber under test in an occurrence point display region, the operation detection unit detects a tap operation on two different occurrence points in the occurrence point display region, a calculation unit that calculates a loss and a distance between the two occurrence points where the tap operation has been detected is further provided, and the display unit highlights the occurrence points where the tap operation has been detected and displays the distance and the loss calculated by the calculation unit in the information display region.

7. The optical time domain reflectometer according to claim 1, wherein the display unit displays a plurality of icons corresponding to the events in order of the events in the optical fiber under test.

8. The optical time domain reflectometer according to claim 2, wherein the display unit displays a plurality of icons corresponding to the events in order of the events in the optical fiber under test.

9. The optical time domain reflectometer according to claim 5, wherein the display unit displays a plurality of icons corresponding to the events in order of the events in the optical fiber under test.

10. The optical time domain reflectometer according to claim 1, wherein the display unit displays the icon of the event located in the specific region as an icon larger than icons of events located outside the specific region.

11. The optical time domain reflectometer according to claim 2, wherein the display unit displays the icon of the event located in the specific region as an icon larger than icons of events located outside the specific region.

12. A display method of an optical time domain reflectometer, comprising:

a measurement step of making a light pulse be incident on an optical fiber under test and receiving return light that returns due to reflection or scattering of the light pulse in the optical fiber under test;

an event detection step of detecting events where an intensity of the return light changes using a measurement result in the measurement step;

a display step of displaying a plurality of icons corresponding to the events in an event display region of a display unit and displaying information of an event, which is indicated by an icon located in a specific region of the event display region, in an information display region of the display unit; and an event-of-interest changing step of, when a swipe operation in the event display region is detected, scrolling icons displayed in the event display region according to the swipe operation and changing the display of the information display region to information corresponding to the event indicated by the icon located in the specific region.

13. The display method of an optical time domain reflectometer according to claim 12, wherein, in the display step, a plurality of icons corresponding to the events are displayed in order of the events in the optical fiber under test.

14. The display method of an optical time domain reflectometer according to claim 12, wherein, in the display step, the icon of the event located in the specific region is displayed as an icon larger than icons of events located outside the specific region.

15. The display method of an optical time domain reflectometer according to claim 13, wherein, in the display step, the icon of the event located in the specific region is displayed as an icon larger than icons of events located outside the specific region.

16. A display method of an optical time domain reflectometer, comprising:
- a measurement step of making a light pulse be incident on an optical fiber under test and receiving return light that returns due to reflection or scattering of the light pulse in the optical fiber under test;
- an event detection step of detecting events where an intensity of the return light changes using a measurement result in the measurement step;
- a display step of displaying a plurality of icons corresponding to the events in an event display region of a display unit and displaying information of an event, which is indicated by an icon located in a specific region of the event display region, in an information display region of the display unit; and
- an event-of-interest changing step of, when a tap operation on the icon in the event display region is detected, scrolling icons displayed in the event display region to move the icon, at which the tap operation has been detected, to the specific region so that the display of the information display region is changed to information corresponding to the event indicated by the icon located in the specific region.

17. The display method of an optical time domain reflectometer according to claim 16,
wherein, in the display step, a plurality of icons corresponding to the events are displayed in order of the events in the optical fiber under test.

18. The display method of an optical time domain reflectometer according to claim 16,
wherein, in the display step, the icon of the event located in the specific region is displayed as an icon larger than icons of events located outside the specific region.

19. The display method of an optical time domain reflectometer according to claim 17,
wherein, in the display step, the icon of the event located in the specific region is displayed as an icon larger than icons of events located outside the specific region.

* * * * *